US012039069B2

(12) United States Patent
Tiwari

(10) Patent No.: US 12,039,069 B2
(45) Date of Patent: Jul. 16, 2024

(54) METADATA-DRIVEN RESTRICTED MEASURES

(71) Applicant: SAP SE, Walldorf (DE)

(72) Inventor: Rahul Tiwari, Bengaluru (IN)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 17/582,971

(22) Filed: Jan. 24, 2022

(65) Prior Publication Data

US 2023/0237179 A1 Jul. 27, 2023

(51) Int. Cl.
*G06F 21/00* (2013.01)
*G06F 21/62* (2013.01)

(52) U.S. Cl.
CPC .................. *G06F 21/6218* (2013.01)

(58) Field of Classification Search
CPC .................. G06F 21/6218; G06F 21/6227
See application file for complete search history.

(56) References Cited

U.S. PATENT DOCUMENTS

| 11,074,261 | B1* | 7/2021 | Pandis | G06F 16/9535 |
| 2010/0169639 | A1* | 7/2010 | Jeffries | G06Q 30/06 |
| | | | | 713/153 |
| 2011/0055231 | A1* | 3/2011 | Huck | G06F 16/2453 |
| | | | | 707/774 |
| 2012/0023421 | A1* | 1/2012 | Demant | G06F 9/452 |
| | | | | 715/765 |
| 2018/0060365 | A1* | 3/2018 | Mujumdar | G06F 16/211 |
| 2018/0285418 | A1* | 10/2018 | Petropoulos | G06F 16/3332 |
| 2020/0042648 | A1* | 2/2020 | Rao | G06F 16/2457 |
| 2020/0099773 | A1* | 3/2020 | Myers | H04L 67/34 |
| 2021/0409415 | A1* | 12/2021 | Hamel | H04L 63/102 |

OTHER PUBLICATIONS

Goldschmidt et al., "Cloud-Based Control: A Multi-Tenant, Horizontally Scalable Soft-PLC", 2015 IEEE 8th International Conference on Cloud Computing, Jun. 27, 2015.*
Capire, Core Data Services, "Expression Notation (CXN)," https://cap.cloud.sap/docs/cds/cxn, printed Dec. 2, 2021, 8 pages.

(Continued)

*Primary Examiner* — Morshed Mehedi
(74) *Attorney, Agent, or Firm* — Klarquist Sparkman, LLP

(57) ABSTRACT

A computer implemented method can receive a metadata definition of a restricted measure pertaining to a database including a plurality of database tables. The restricted measure has a label, and the metadata definition includes one or more filter criteria configured to filter values contained in the plurality of database tables. In a report designer user interface for a report, the method can present the label of the restricted measure as an option based on the metadata definition. The method can receive a selection of the label of the restricted measure in the report designer user interface. Responsive to the selection, the method can link the metadata definition of the restricted measure to the report. When generated, the report requests access to the values contained in the plurality of database tables via application of the one or more filter criteria of the metadata definition.

20 Claims, 13 Drawing Sheets

(56) References Cited

OTHER PUBLICATIONS

SAP Analytics Cloud, "Enhance your Analysis with Restricted Measures," SAP HANA Journey, https://saphanajourney.com/sap-analytics-cloud/learning-article/enhance-your-analysis-with-restricted-measures/, printed Aug. 18, 2021, 30 pages.

Simon Kessler, "SAP Analytics Cloud (SAC): Integration with SAP Cloud Platform/HTML5 Apps," SAP Blogs, https://blogs.sap.com/2018/05/17/sap-analytics-cloud-sac-integration-with-sap-cloud-platform-html5-apps/, May 17, 2018, 17 pages.

\* cited by examiner

```
{
  "dataSource": {
    "packageName": "OrcaQBTest.DomainA",
    "entities": [
      "SIMPLE_OBJECT",
      "JOIN_OBJECT_1"
    ]
  },
  "associations": [
    {
      "sourceEntity": "SIMPLE_OBJECT",
      "sourceElement": "SIMPLE_OBJECT_ID",
      "targetEntity": "JOIN_OBJECT_1",
      "targetElement": "REF_TO_SIMPLE_OBJECT_ID"
    }
  ]
}
```

500

```
const ANAENGCAND = {
    httpConnectionUrl: 'http://hana02-01.hcm-eng.c.eu-de-2.cloud.sap:8002',
    dbconnectionUrl: 'jdbc:sap://hana02-01.hcm-eng.c.eu-de-2.cloud.sap:30215/',
    dbPoolId: 'dbPool1',
    hostName: 'hanadev.openstack.eu-de-1.cloud.sap',
    sqlPort: 30215,
    httpsPort: 8002,
    companySchemaName: 'ENGXSA_PLTNGDQ1V1H',      ⟵ 710
    companyPackageName: 'PLTNGDQ1V1H_SAC'
};
```

FIG. 7

```
"@Analytics.dbViewType": {
    "#": "DATA_BASE_TABLE"
},
"elements": {
    "EMP_ID": {
        "@Common.Label": "Employee Id",
        "type": "cds.Integer"
    },
    "AMOUNT": {
        "@Common.Label": "Salary Amount",
        "type": "cds.Integer",
        "@Analytics.Measure": true,
        "@Aggregation.default": {
            "#": "SUM"
        }
    },
```

CREATE VIEW <new Schema name>,<new calc view name>

AS SELECT <selected Columns from original table selected in query designer such as> EMD_ID as employeeId, AMOUNT as "Salary of employees between 20 to 25>

FROM <original scheme i.e.ENGXSA_PLTNGDQ1V1H here>.<original table i.e. COMPANY.SALARY >

<join condition> <where conditions>

// condition applied to the measure/restricted measure are eventually added to the calculation view created.

METADATA-DRIVEN RESTRICTED MEASURES

BACKGROUND

In a multitenant cloud-based computing environment, one instance of a software application and supporting infrastructure can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application and the underlying data of the tenants can be kept separate and secure. For example, a tenant can access a database comprising a plurality of database tables that are specific to the tenant. In some circumstances, a report user of the tenant may want to generate a report based on underlying data stored in the tenant-specific database tables. However, the report user may not have permission(s) to directly access the underlying data. Instead, the report user may only be authorized by the tenant to access certain restricted measures which are constructed and/or filtered from the underlying data. Also, constructing restricted measures for individual report users can be tedious and time consuming. Accordingly, room for improvement exists for more efficient management of restricted measures in a multitenant cloud-based computing environment.

BRIEF DESCRIPTION OF THE DRAWINGS

FIG. 7 is an example data structure containing information of an established connection after successful authentication of a report designer.

FIG. 8 is an example database view structure mapping the restricted measure defined in FIG. 4 to the underlying measure.

FIG. 9 is an example query structure corresponding to a restricted measure.

DETAILED DESCRIPTION

Example 1

Figure 1:
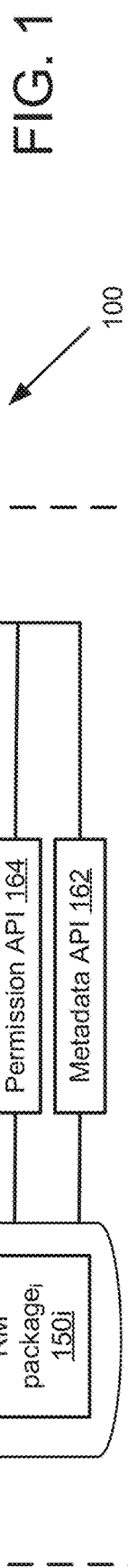
FIG. 1 is an overall block diagram of an example cloud-based system supporting metadata-driven restricted measures.

Overview of Restricted Measures in Cloud-Based Computing Environment

In a multi-tenant cloud-based computing system, a single software instance can serve multiple, distinct tenants or customers. Multitenancy is a feature in many types of cloud computing services, such as infrastructure-as-a-service (IaaS), platform-as-a-service (PaaS), software-as-a-service (SaaS), containers, and serverless computing. For example, a SaaS provider can run a single instance of an application and offer access to individual tenants. Each tenant's data can remain isolated, although it can access the same software as other tenants.

A multi-tenant application can provide functionality associated with a service provider's line of business. Such an application is sometimes referred to herein simply as "LoB." As an example, certain enterprise cloud integration services, such as the SAP Analytics Cloud (SAC) provided by SAP SE of Walldorf, Germany, can provide an integrated platform and/or tool suite supporting many LoB software products in a multi-tenant cloud-based computing environment, such as SAP SuccessFactors for human resource management, SAP S/4HANA for enterprise resource planning, etc. Some of the cloud integration services can integrate features for multi-tenancy handling and workload management (e.g., setting tenant specific context information). In certain circumstances, the cloud integration services can have an access infrastructure which enables applications to perform analytics, planning, and search on data stored in tenant specific databases (e.g., to allow users to define queries using rich or complex semantics).

In certain circumstances, some of the cloud integration services allow LoB users to analyze and/or visualize their underlying data in analytical dashboards (e.g., creating a story by embedding a bar graph, a pie chart, and/or the like, in a report). In certain examples, some LoB report users may request the cloud integration services to create reports containing restricted measures.

As described herein, a measure refers to a parameter or attribute in a database that can be quantified (e.g., via operations such as counting, addition, subtracting, multiplication, division, or the like), such as salary, price, age, etc. A restricted measure, as described herein, refers to a quantitative, numerical measurement of underlying measure(s) (also referred to as "original measure(s)") stored in the database by applying one or more filters to the underlying measure(s). In other words, a restricted measure shows a filtered or transformed measure instead of the underlying or original measure(s). Thus, including the restricted measure in a report can present the filtered measure while hiding the underlying measure(s). This can be helpful when the underlying measure(s) include sensitive information that should not be disclosed to the viewer of the report, and/or if the viewer of the report is concerned primarily about the restricted measure but not the underlying measure(s).

As described herein, the restricted measure can filter the underlying measure(s) along specific dimensions. The dimensions can be descriptive attributes or characteristics of the underlying measure(s) that can be given different values (e.g., time dimension, location dimension, etc.). For example, a restricted measure can show a count of customers residing in multiple regions (i.e., count filter along the geo-graphical dimension) instead of individual customers;

another restricted measure can show an average of employee age (e.g., average filter along the age dimension) instead of ages of individual employees; etc.

In response to a request to generate a report containing a restricted measure, a query corresponding to the restricted measure can be executed against database tables containing the underlying measure(s). The restricted measure can be calculated by applying the one or more filters of the restricted measure to the underlying measure(s) returned by the query.

According to one approach, a report user who wants to include a restricted measure in a report can create the restrict measure by him/herself. For example, the report user can be given access to the original measures, based on which the report user can create a view in the database representing the restricted measure by specifying what filters are applied to certain original measures. While this approach gives flexibility to the report user to create restricted measures, the report user can be burdened by the complex tasks. For example, the support user would have to learn various programming functions and/or syntaxes to create the views or the restricted measures. In addition, the views or restricted measures created by one report user are limited to that report user and may not be sharable with other report users. Further, it may not be desirable to let the report user access the original measures, which may contain confidential or otherwise sensitive information.

According to another approach, the restricted measure can be hard coded and saved in the database by the cloud integration service team for a particular LoB. As an example, the restricted measure can be a predefined database view, which is based on a query running against database tables containing the underlying measure(s). However, an administrator will have to work with database teams to determine whether a client is allowed to access the predefined view or the restricted measure based on the client's license or authorization status. From time to time, the cloud integration service team may be burdened to create new restricted measures, delete old restricted measures, and/or modify existing restricted measures for the LoB, as needed.

Both approaches described above are inflexible because they merge the restricted measure with the database view. As such, the LoB users have no control over any change in the restricted measures. For example, when a LoB user needs a new restricted measure, the LoB user would have to either self-create the restricted measure or request the cloud integration service team to create the restricted measure for him/her.

The technology described herein can overcome the shortcomings described above by using metadata-driven restricted measures, which can decouple the restricted measures from the database views, thus allowing LoB users to manage restricted measures based on license or permission of tenants. Specifically, the restricted measures a LoB user can access are based on permission and licensing. The LoB user can update the list of restricted measure based on result of any database view change or licensing term change. These restricted measures are not predefined or pre-created in the actual database view. Thus, the original database views and tables are not updated when a new restricted measure is added, deleted, or updated from the metadata list in a query designer or report designer user interface as described below. Instead, the restricted measures can be created in calculation view when they are included in the query designer. The underlying measures are hidden from the LoB users. Thus, restricted measures can be created, modified, and the like via metadata as described herein, providing a low code or no code solution to rich report generation.

Example 2

Example Overview of Cloud-Based System Supporting Metadata-Driven Restricted Measures FIG. 1 shows an overall block diagram of an example cloud-based system 100 configured to support metadata-driven restricted measures.

The cloud-based system 100 includes a cloud computing environment 110 which includes a cloud integration service 160. As noted above, the cloud integration service 160 can be configured to handle multi-tenancy (e.g., tenant authentication, etc.), manage and/or balance workload, perform analytics, planning, and search on data stored in tenant specific databases, creating a story or report, etc.

As shown, the cloud computing environment 110 can include one or more applications 140a, 140b, . . . , 140k that are respectively directed to different LoBs. Each application can have a corresponding LoB data center, e.g., the application 140a can have a corresponding LoB data center 120. The application 140a can be shared by multiple tenants, and each tenant can have a tenant-specific database within the LoB data center 120. Each database in the LoB data center 120 can include a plurality of database tables and predefined views 122 that are specific to a particular tenant (i.e., tenants have separate databases such that a tenant can only access its own database tables and views). In addition, the LoB data center 120 can include a calculation views repository 124 which includes one or more calculation views that are created based restricted measures 150 as described further below. In contrast to the tenant-specific database table and predefined views 122 which can only be accessed by a corresponding tenant, the calculation views in the repository 124 can be created on-demand and can be shared or reused by multiple tenants.

As shown, the cloud computing environment 110 includes a restricted measure (RM) metadata repository 150, which includes a plurality of RM (restricted measure) packages, e.g., 150a, 150b, . . . , 150i. Each RM package can include one or more RM metadata definitions. In the depicted example, the RM package 150a includes a plurality of RM metadata definitions 155a, 155b, . . . , 155n. In certain scenarios, the plurality of RM packages can be associated with different applications or LoBs. In certain scenarios, multiple RM packages can be associated with one application or LoB.

The RM metadata definitions corresponding to a particular application or LoB can be provided by a LoB administrator 130 through a LoB user interface 132. For example, if the LoB administrator 130 is an authorized tenant user for the application 140a, through the LoB user interface 132, the LoB administrator 130 can add, delete, and/or modify RM metadata definitions in the RM package 150a.

As an example, the cloud computing environment 110 can maintain a metadata application programming interface (API) 162. Through the LoB user interface 132, the LoB administrator 130 can provide tenant specific semantic metadata based on a specific interface format (that is compatible with the metadata API 162), which can be read by cloud integration services 160 to perform certain analytics of the data stored in the tenant specific database tables, e.g., 122.

The cloud computing environment 110 can also include a permission or license API 164. Through the LoB user interface 132, the LoB administrator 130 can specify and/or configure permissions for different tenant users to access the restricted measures defined in the RM metadata repository 150 that are associated with the LoB application. For example, assuming the application 140a is associated with two RM packages 150a and 150b, the LoB administrator 130 can configure one tenant user to have access to RM package 150a only and another tenant user to have access to RM package 150b only, based on different licensing agreements signed by the two tenant users. Access can be controlled by activation, permissions, licensing, and the like.

As shown, a report designer 180 (e.g., report designer user) who is authorized by a tenant user of the application 140a can access a report designer user interface 182 (also referred to as a "query designer," see e.g., FIG. 6), which connects to the application 140a through the cloud integration service 160. As described further below, based on the permissions configured by the LoB administrator 130, restricted measures that can be accessed by the tenant user, also referred to as RM options 184, can be presented to the report designer 180 via the report designer user interface 182. The report designer can select one or more RM options 184 and add their corresponding calculation views to the calculation view repository 124, which can be displayed or made available to report users as described below.

As shown, a report user 190 who is authorized by the tenant user of the application 140a can access a reporting user interface 192, which connects to the application 140a through the cloud integration service 160. The reporting user interface 192 can show not only predefined views (e.g., 122), but also calculation views corresponding to the restricted measures that have been created on demand and added to the calculation view repository 124 by the report designer 180. Thus, through the reporting user interface 192, the report user 190 can submit a request to generate a report 194 including one or more restricted measures according to specified presentation format(s). When the report user 190 requests to add a restricted measure to a chart, a crosstab, or the like, in a report, a query is created which can be executed on the calculation view, which is created in a query designer or report designer user interface as described further below. The application 140a can include a report engine 142. In response to the request, the report engine 142 can execute the queries corresponding to the restricted measures and generate the report 194 including presentation of the restricted measures 196 according to the specified presentation format(s).

In practice, the systems shown herein, such as system 100, can vary in complexity, with additional functionality, more complex components, and the like. For example, there can be additional functionality within the cloud integration service 160. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the metadata, the definitions, the views, and the like can be stored in one or more computer-readable storage media or computer-readable storage devices. The technologies described herein can be generic to the specifics of operating systems or hardware and can be applied in any variety of environments to take advantage of the described features.

Example 3

Example Overall Method of Implementing Metadata-Driven Restricted Measures

Figure 2:
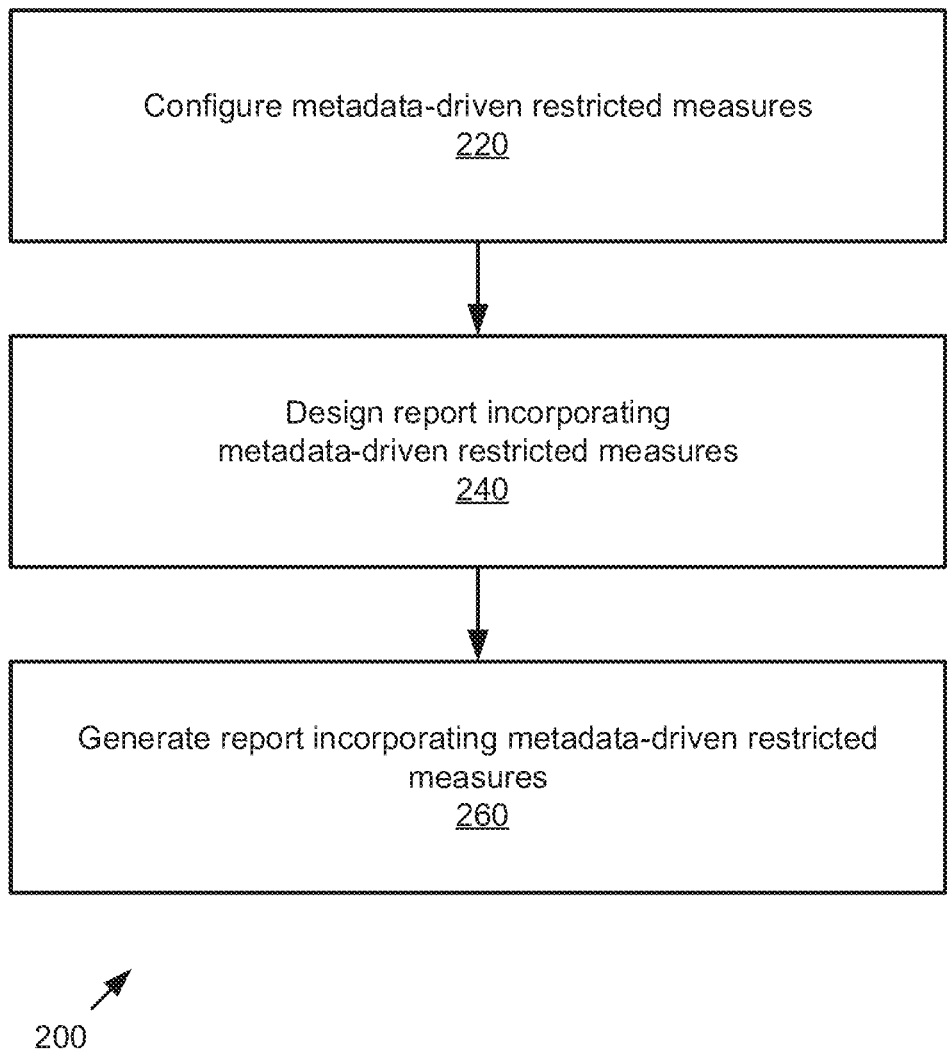
FIG. 2 is a flowchart illustrating an example overall method of implementing metadata-driven restricted measures.

FIG. 2 is a flowchart illustrating an overall method of implementing metadata-driven restricted measures, and can be performed, for example, by the system of FIG. 1. The method can be described in three stages or phases.

In the first stage 220 (also referred to as the "configuration phase"), metadata-driven restricted measures can be created or configured by a LoB administrator (e.g., 130). As described above, the LoB data centers (e.g., 120) includes database tables (e.g., 122) which a tenant user can access for analytics. The LoB administrator can determine what restricted measures are desired, e.g., based on a survey of tenant users, anticipated reporting needs, or the like. The LoB administrator can then generate metadata definitions of the restricted measures based on a specific interface format. For example, the metadata definitions can be saved in object notation (e.g., CSON, JSON, or the like) files. The cloud integration service (e.g., 160) can read such metadata definitions using metadata API (e.g., 162) and present it to the report designer user interface (e.g., 182) in the second stage 240. As described further below, the metadata definitions can be structured in a way that maps the restricted measure to underlying measures. The metadata definitions of the restricted measures can then be added to one or more RM packages and stored in the RM metadata repository (e.g., 150). In certain cases, the LoB administrator can delete or modify a metadata definition in a RM package. In certain examples, the LoB administrator can add/delete/edit metadata definitions in a RM package by using query builder APIs hosted in the cloud integration service 160. For example, the LoB administrator can use metadata/createCSN calls to create metadata for an RM and/or use deploy/metadata APIs to update metadata for an RM.

In practice, this first stage can be performed by a separate party (e.g., third party) that provides restricted measures as an activatable package depending on the domain, application, or the like. Alternatively, a tenant can create its own restricted measures. However, the tenant may wish to share such restricted measures with others to increase efficiency and/or re-use.

Figure 6:
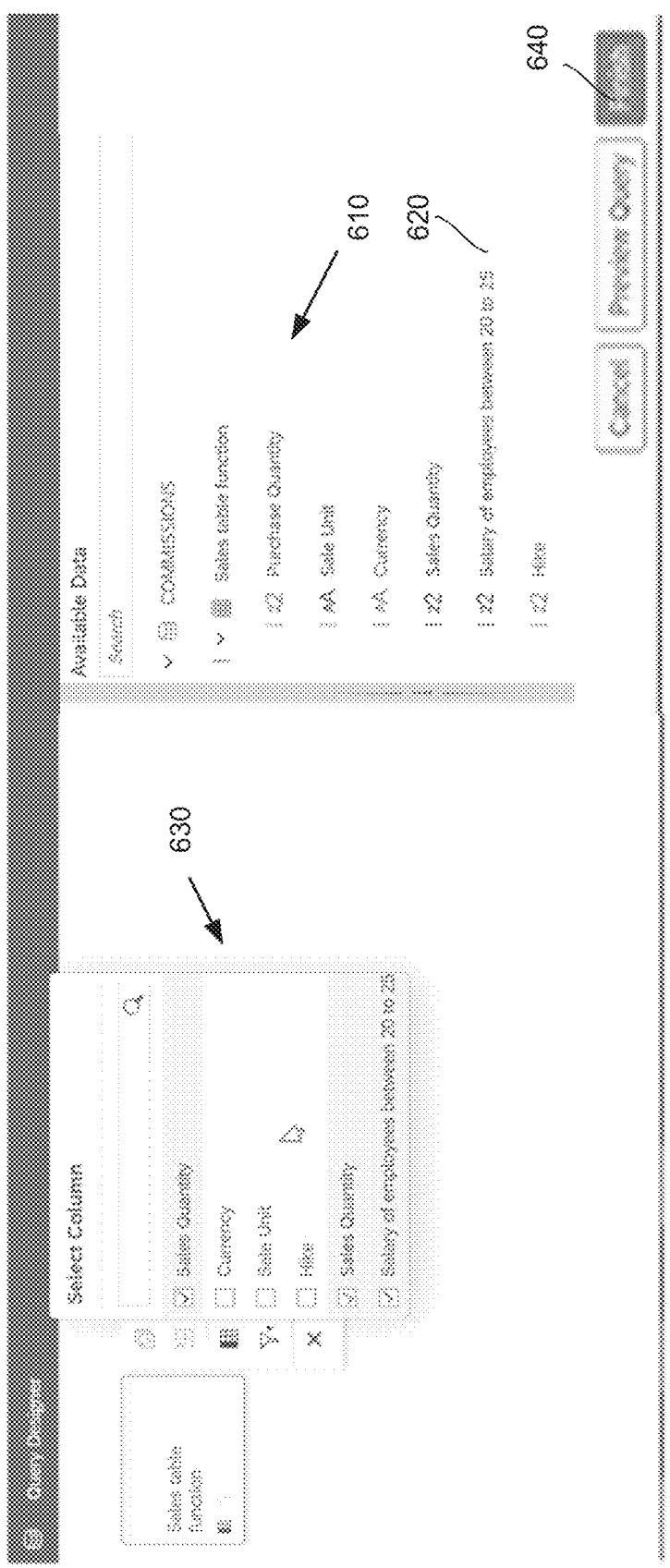
FIG. 6 is an example report designer user interface incorporating a metadata-driven restricted measure as described herein.

In the second stage 240 (also referred to as the "design phase"), a report designer (e.g., 180) can design a report incorporating metadata-driven restricted measures. In practice, a report can be designed by using a report designer tool that creates a report definition (e.g., sometimes called a "story"). For example, the report designer can access a report designer user interface (e.g., 182), which can list the restricted measures that the report designer is permitted to access. The report designer can select one or more restricted measures. To generate the report definition, the report designer does not need to learn application-specific syntax to create restricted measures. Instead, the report designer can simply drag and drop desired restricted measures into a report definition. Based on the restricted measure, respective calculation views can be created. The created calculation views can include queries which run against one or more database tables so that the query results return restricted measures that are filtered from the underlying measures. For example, the cloud integration service (e.g., 160) can provide a user access to original database tables and views. When the user selects a table column or adds a join, upon confirmation (e.g., by clicking a "finish button" as illustrated in FIG. 6), a SELECT query can be made to the original table column and a new calculation view can be created. The created calculation views can be added to the calculation view repository (e.g., 124) of the database, which can be displayed or made available to report users in the third stage 260 for generating reports incorporating the restricted measures.

In the third stage 260 (also referred to as the "runtime phase" or "report phase"), a report user (e.g., 190) can generate a report incorporating metadata-driven restricted measures. For example, the report user can access a reporting user interface (e.g., 192) that accesses the report definition created in the design phase. The report definition can support multiple options and be presented to the report user in the form of a template. The report user interface can show a variety of options available for incorporation into reports, including ordinary measures, the restricted measures represented by calculation views, and the like. In certain circumstances, what measures (including ordinary measures corresponding to predefined views and/or restricted measures corresponding to calculation views) are available to the report user (i.e., the report user can see in the reporting user interface) can be additionally determined by permission objects preconfigured by the LoB administrator (e.g., via the permission API 164). The report user can submit a request to generate a report incorporating one or more available restricted measures according to specified presentation format(s). To generate such a request, the report user does not need to learn application-specific syntax to create restricted measures. Instead, the report user can simply drag and drop desired restricted measures into a report template. Responsive to the request, queries associated with the calculation views can be executed and the restricted measures can be embedded in the report according to specified presentation format(s).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4

Figure 3:
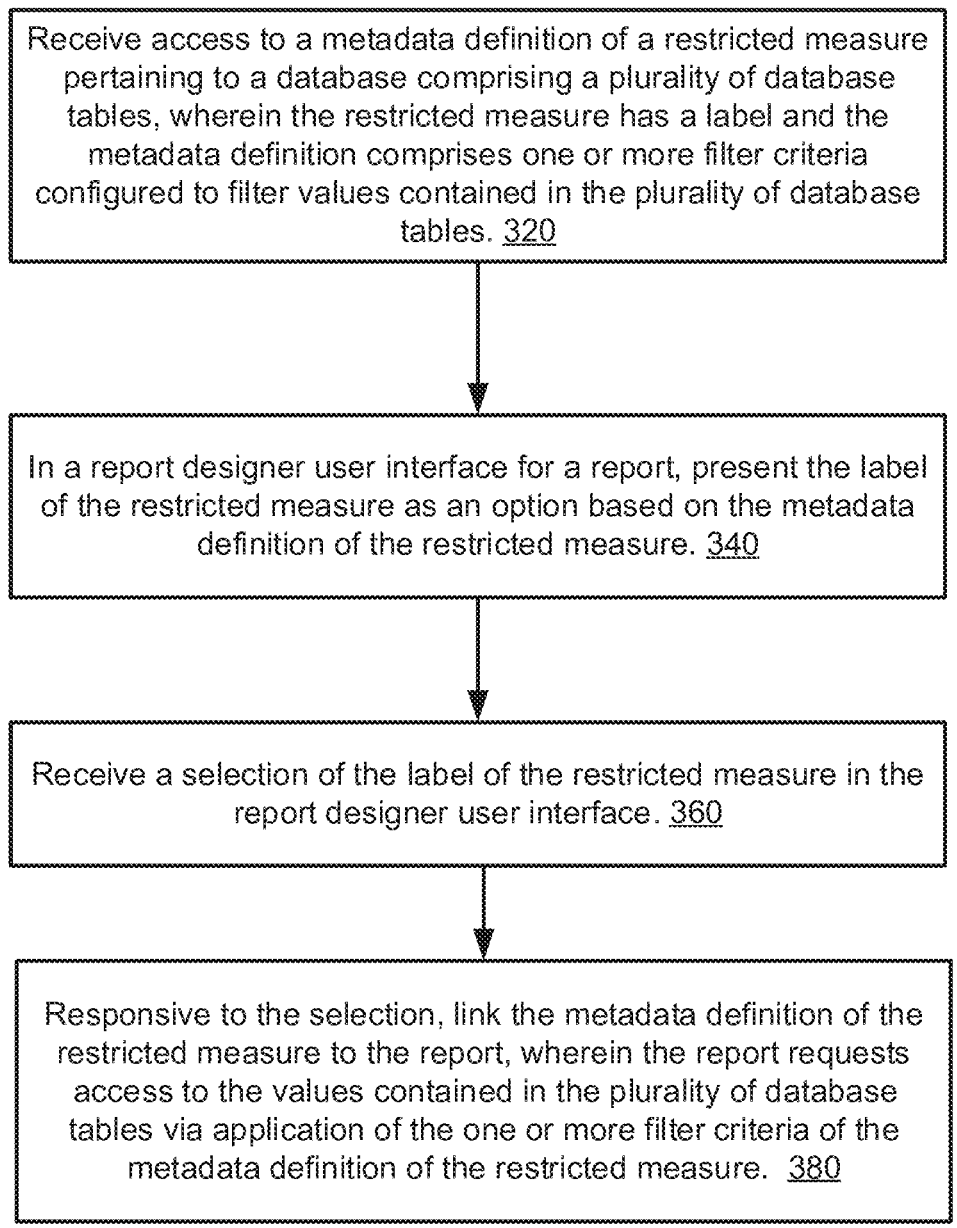
FIG. 3 is a flowchart illustrating an example overall method of designing a report incorporating metadata-driven restricted measures.

Example Overall Method of Designing Report Incorporating Metadata-Driven Restricted Measures FIG. 3 is a flowchart of an example overall method 300 of designing report incorporating metadata-drive restricted measures, which corresponds to the second stage 240 depicted in FIG. 2.

At 310, the method 300 can receive access to a metadata definition of a restricted measure pertaining to a database comprising a plurality of database tables. The restricted measure has a label, and the metadata definition can include one or more filter criteria configured to filter values contained in the plurality of database tables.

At 320, in a report designer user interface for a report, the method 300 can present the label of the restricted measure as an option based on the metadata definition of the restricted measure.

In certain examples, presenting the restricted measure as an option can be performed responsive to determining that a package of restricted measures comprising the restricted measure is activated. In certain examples, presenting the restricted measure as an option can be performed responsive to determining that a tenant has permissions to a package of restricted measures comprising the restricted measure, and the report designer is authorized by the tenant to access the report designer user interface.

For example, a report designer (user) of a tenant user can be authorized by the tenant user to access the report designer user interface. The tenant user can have permissions to access a selected package of restricted measures based on a licensing agreement executed by the tenant. Thus, when the report designer accesses the report designer user interface, the selected package of restricted measures can be activated and the restricted measures within the selected package can be presented to the report designer as options for selection.

In certain examples, the report designer user interface is hosted within an application, and the restricted measure is one of a plurality of restricted measures in a restricted measure package specific to the application. For example, the application can correspond to a specific LoB which is associated with a specific package of restricted measures. The method 300 can further select the restricted measure package specific to the application.

At 330, the method 300 can receive, from a report designer, a selection of the label of the restricted measure in the report designer user interface.

At 340, responsive to the selection, the method 300 can link the metadata definition of the restricted measure to the report (e.g., in a definition of the report). For example, the report can have an underlying database connection via the cloud integration service 160 and point to the calculation views stored in the calculation views repository 124. Subsequently, when generated (e.g., executed), the report requests access to the values contained in the plurality of database tables via application of the one or more filter criteria of the metadata definition of the restricted measure.

In certain examples, linking the metadata definition of the restricted measure to the report can include generating a presentation of the restricted measure responsive to determining that the report user has permissions to access the restricted measure.

In certain examples, responsive to the selection and before a request to generate the report has been received, the method 300 can create a view for the restricted measure based on the metadata definition and storing the view in the database. Creating the view can include creating a query against a selected database table, wherein the selected database table can be one of the plurality of database tables defined by a schema of the database. Creating the query can include identifying the schema of the database based on an authenticated connection between the report designer user interface and the database. Additionally, creating the query can include parsing the metadata definition to identify one or more columns of the selected database table. In certain cases, for predefined reports like a template report or sample reports, a pre calculation for restricted measures can be performed. Otherwise, calculation of restricted measures can be performed on demand initially (e.g., on the first request of generating the restricted measure in a report), and then certain caching mechanism can be used to reuse previously created reports including such restricted measures to improve efficiency of query execution corresponding to the restricted measures.

In certain examples, the method 300 can add the restricted measure to a package of restricted measures specific to an application, and the application is configured to control access to the package of restricted measures. In certain examples, the 300 can delete and/or modify a restricted measure in a package of restricted measures.

Example 5

Example Metadata Definition of Restricted Measures

Figure 4:
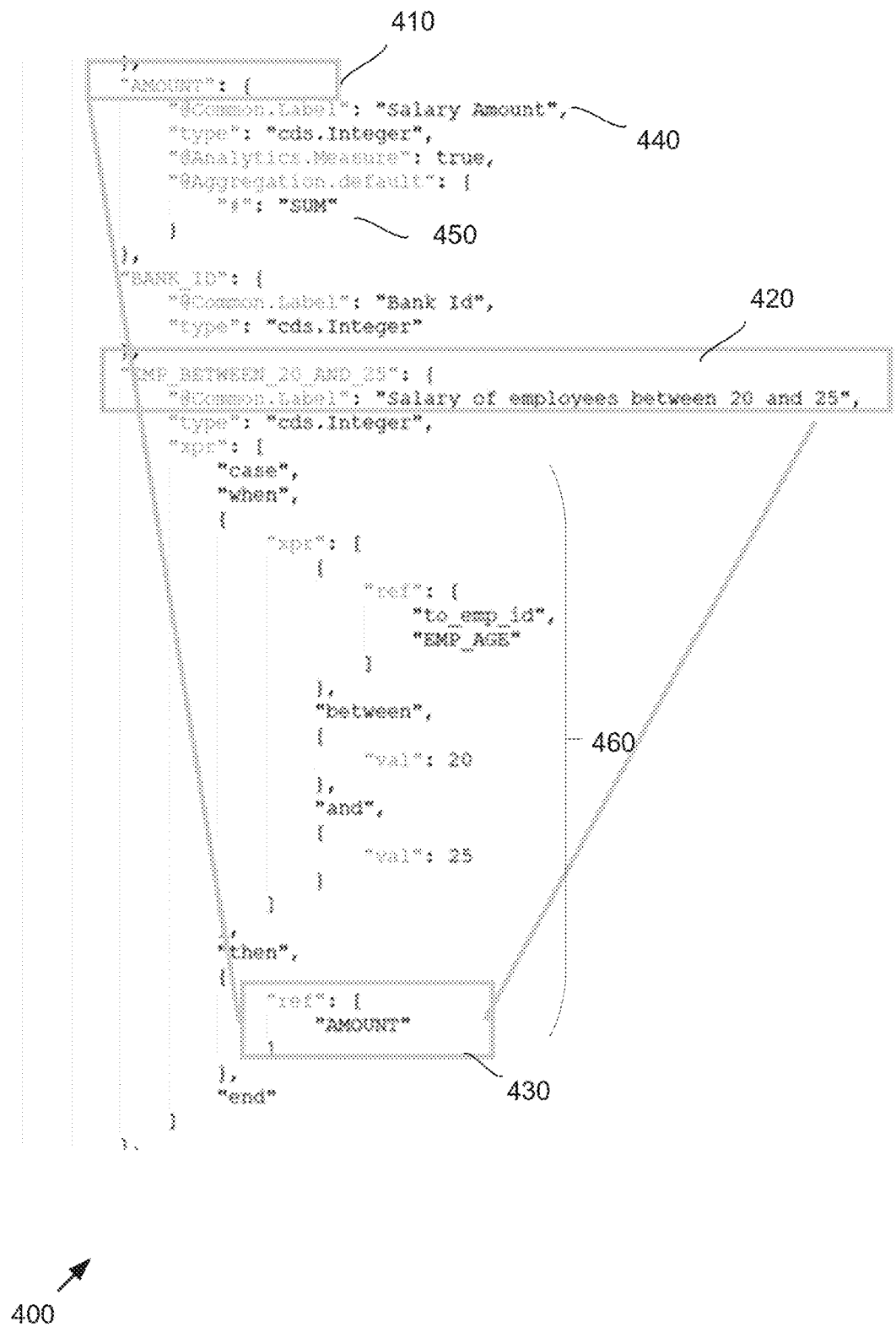
FIG. 4 is an example metadata definition of a restricted measure.

FIG. 4 shows an excerpt of a metadata definition 400 of a restricted measure, according to one example. In certain examples, the metadata definition 400 can be included in an object notation (e.g., CSON, JSON, or the like) file created by a LoB administrator (e.g., 130). For example, by using the query builder APIs hosted in the cloud integration service 160, the LoB administrator can use metadata/createCSN calls to create the metadata definition 400 and/or use deploy/metadata APIs to update the metadata definition 400.

Figure 5:
FIG. 5 is an example structure of a request body configured to generate a metadata definition in an object notation file.

In certain examples, the object notation file can be created via the Query Builder (QBuilder) API, e.g., by submitting some simple information using a request body, such as the request body 500 depicted in FIG. 5. As shown, the request body 500 includes two objects: a "dataSource" object and an "associations" list. The "dataSource" objects can define a list with calculation view IDs or a list with IDs of SQL views, database tables, or table functions. The "associations" are relations between database object and/or views. Objects and/or views which are connected with an association can be joined in a query. If associations between entities are to be present in the object notation file, they can be configured in the "associations" list in the request body, e.g., by specifying the source entity ID and the source element, as well as the target entity ID and the target element. The object notation file can then be generated based on the transferred information and the read out of the system tables. For example, the cloud integration service 160 can be connected to the LoB database tables and schema via the Java Database Connectivity (JDBC) API using a specific user who has access of the LoB package. The details of the request body 500 can be modified by the LoB users from the start up script and any updated values can be read by the cloud integration service 160. Upon completion of the query building process (e.g., by clicking a "finish button" as illustrated in FIG. 6), the request body 500 can be passed to backend code of the cloud integration service 160 which uses the JDBC API to create a calculation view through an inner SELECT statement to query respective table, column of the original LoB tables.

Returning to the metadata definition 400 in FIG. 4, which defines a restricted measure "EMP_BETWEEN_20_AND_25" 420, which has a label "Salary of employees between 20 and 25." In this example, the restricted measure 420 is filtered from the underlying measure "AMOUNT" 410, which has a label "Salary Amount." Normally, the @Common.Label specifies the label name to be displayed on a query designer or report designer user interface. Thus, the "Salary Amount" and "Bank_ID" would normally be the displayed labels for the underlying measures. However, in the depicted example, instead of displaying the "Salary Amount" label, the query designer or report designer user interface will display the restricted measure label "Salary of employees between 20 and 25." As a result, instead of presenting the underlying measure 410, the restricted measure 420 can return filtered data such as "Salary of employees between 20 and 25." More specifically, the restricted measure 420 applies a filter defined by a "SUM" operator 450 and an expression 460 (e.g., specified by xpr-case-when-then statements) to the underlying measure 410. As shown, the expression 460 includes a reference 430 to "AMOUNT" (i.e., the underlying measure 410) and limits the selections to employees whose age is between 20 and 25 years old, and the "SUM" operator 450 returns the sum of those selected employees. In other examples, mathematical operators other than "SUM" can be used, such as "MIN," "MAX," "AVERAGE," "COUNT," etc.

Example 6

Example Report Designer User Interface

As described above, a report designer (e.g., user 180) of a tenant can access a report designer user interface (e.g., 182). FIG. 6 shows an example report designer user interface 600, which shows a list 610 of measures from which the report designer can select, including the restricted measures, such as the restricted measure 620 which has the label of "Salary of employees between 20 and 25" and defined in metadata definition 400 of FIG. 4.

As described herein, which restricted measures are shown in the list 610 can be controlled by permissions configured by the LoB administrator (e.g., via permission API 164). For example, when the report designer of a tenant logs onto the report designer user interface 600 (after an authentication process), the permissions of the tenant can be checked. The tenant may have signed a licensing agreement (e.g., with the vendor providing the cloud computing environment 110), based on which the LoB administrator can give permissions for the tenant to access a selected RM package containing a plurality of restricted measures. The package can be activated for a tenant, and thus by association for the users of the tenant. Thus, based on license agreement of the tenant, only restricted measures which the tenant is given permission to access are shown in the list 610. In other words, the restricted measures can be monetizable objects based on licensing model. Of course, the list 610 can also show unrestricted measures (e.g., "Currency," "Sale Unit," etc., as shown in FIG. 6) which are available to tenants without a license to a given measure (i.e., no licensing agreement is required).

The report designer can select a list of measures 630 to be available for incorporating in a report. Any of the measures displayed in the list 610, including the restricted measure 620, can be included in the list 630 (e.g., via selecting checkboxes next to the labels of respective measures). In other words, the selected list 630 can be a subset of the displayed list 610. The report designer can select the measures that are deemed important and/or useful for report generation, instead of making all measures available for report generation, which may be too many and overwhelming to report users generating reports from the report definition or template.

After the report designer finalizes the selection of the list of measures 630 to be available for incorporating into a report, the report designer can add the selected restricted measures into the database query definition. For example, by clicking the "finish" button 640 in the report designer user interface 600, the calculation views corresponding to the selected restricted measures (e.g., 620) can be created and added to a calculation views repository (e.g., 124).

Example 7

Example Query Mapping Between Metadata Definition and Underlying Measures

To access the report designer user interface, the report designer of a tenant can first be authenticated (e.g., by providing a username, a password, tenant identifier, among other information), which can be handled by a cloud integration service (e.g., 160).

Successful authentication of the report designer can establish a connection to the tenant specific database. As an example, FIG. 7 depicts a data structure 700 containing relative information of an established connection, such as connection URL, database URL, host name, port addresses, database schema, etc. In the depicted example, the tenant identifier entered by the report designer is mapped to the schema 710 of the tenant specific database named "ENGXSA_PLTNGDQ1V1H."

These connection information (e.g., 700) can be used along with the metadata definition of a restricted measure. For example, by parsing the metadata definition 400 of FIG. 4, the column names corresponding to the underlying measure, e.g., EMP_ID and AMOUNT, can be fetched and saved as respective fields in a database view structure, such as 800 depicted in FIG. 8.

These fields can be further parsed to create an SQL query, which can be added as a calculation view in the tenant specific database. FIG. 9 depicts an example query structure 900 corresponding to the metadata definition 400 of FIG. 4. In the depicted example, COMPANY.SALARY is a database table defined by the schema "ENGXSA_PLTNGDQ1V1H" and contains the columns EMP_ID and AMOUNT (i.e., the underlying measure). Thus, in FIG. 6, when the report designer selects the restricted measure 620 and click the "finish" button 640, the SQL query corresponding to the restricted measure 620 can be added to the tenant specific database as a calculation view, and the filter defined by the "SUM" operation 450 and the expression 460 can be added to the query structure 900 as join condition and where condition. For example, as described above, when clicking the "finish" button 640, a request body (e.g., 500) can be passed to backend code of the cloud integration service 160 which using the JDBC API to create a calculation view through an inner SELECT query on respective table, column of the original LoB tables.

Example 8

Example Reporting User Interface and Report Generation

Figure 10:
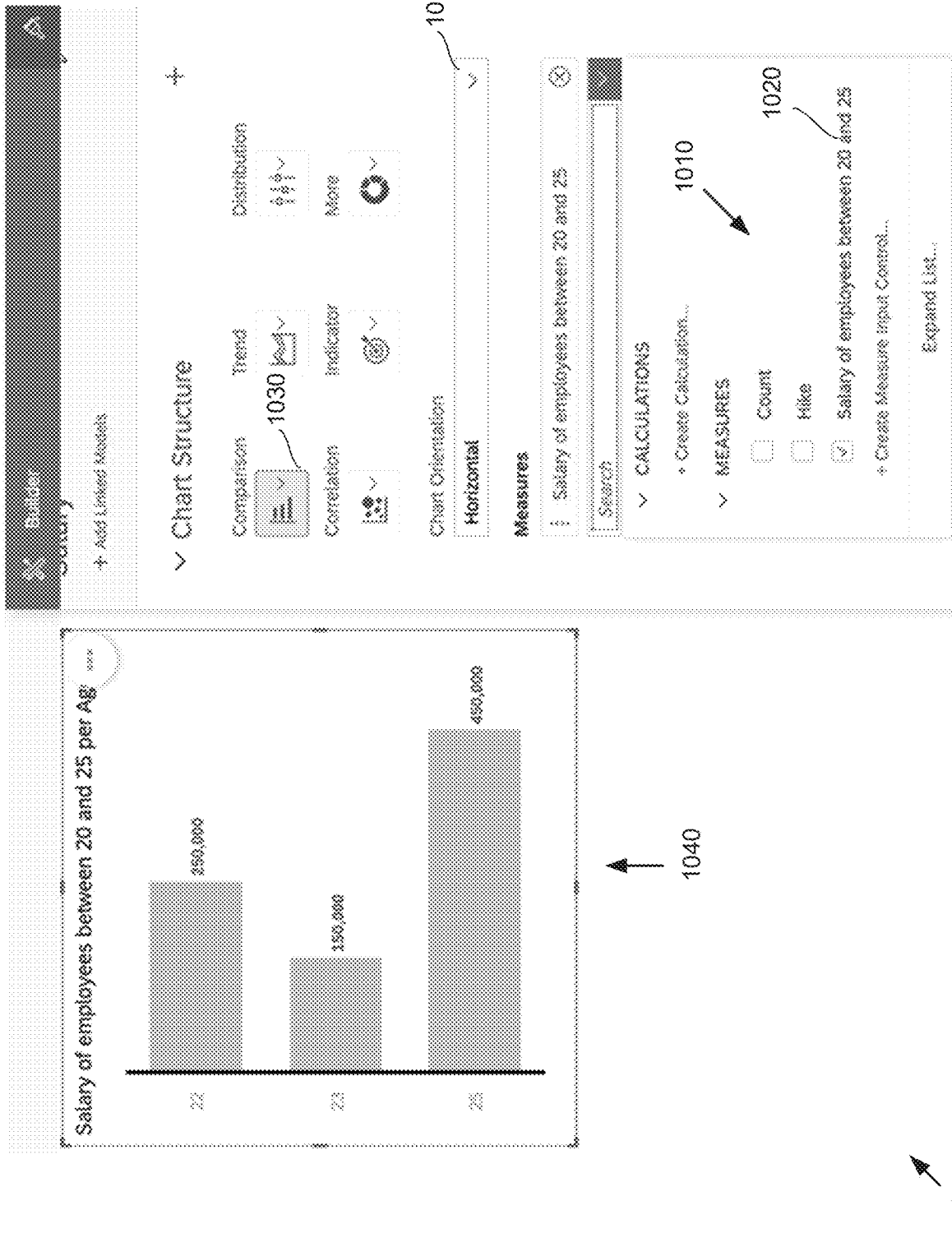
FIG. 10 is an example reporting user interface displaying restricted measures.

FIG. 10 depicts an example reporting user interface 1000 displaying restricted measures, through which a report user can initiate a request to generate a report that has been previously designed as described herein.

As shown, the reporting user interface 1000 can provide a list 1010 of measures from which the report user can select to be included in the report, including certain restricted measures, such as the restricted measure 1020 which has the label of "Salary of employees between 20 and 25" which was previously added to the database as a calculation view by a report designer via the report designer user interface. When the report is generated, the SQL query corresponding to the calculation view is executed. The results returned by the query, or the corresponding restricted measure, can be presented or embedded in the report.

When the report user selects a measure to be included in the report, the report user can also select a presentation format. In the depicted example, the report user checks the box next to the label of the restricted measure 1020, thus initiating a request to generate a report incorporating the restricted measure 1020. The report user also specifies the presentation format as a bar graph (e.g., by selecting a control item 1030) displayed in horizontal orientation (e.g., by selecting a control item 1032). A preview of the presentation of the selected restricted measure in the report is displayed in the window 1040.

When a report user of a tenant logs onto the reporting user interface 1000 (after an authentication process), the permissions of the tenant can be checked. As described herein, only measures (including restricted measures and unrestricted measures) that are selected by a report designer (e.g., 180) of the tenant in the report designer user interface (e.g., 182) are shown or otherwise viewable on the reporting user interface 1000. For example, the tenant's license agreement may entitle the tenant to access a package of N restricted measures, but the report designer may have only selected M (where M<N) restricted measures and add the selected M restricted measures to the calculation view repository. As such, the report user of the tenant can only see those M restricted measures in the reporting user interface 1000.

In some circumstances, when the report user attempts to select a restricted measure to be included in a report, another permission check can be performed to determine if the report user has permission to access the restricted measure. This permission check is in addition to the permission check of the tenant. That is, even if the restricted measure is displayed in the reporting user interface 1000, it can still be restricted to the certain report users. For example, a restricted measure may be grayed out for a specific report user based on the report user's permission status.

Example 9

Example Reusable Restricted Measures

Figure 11:
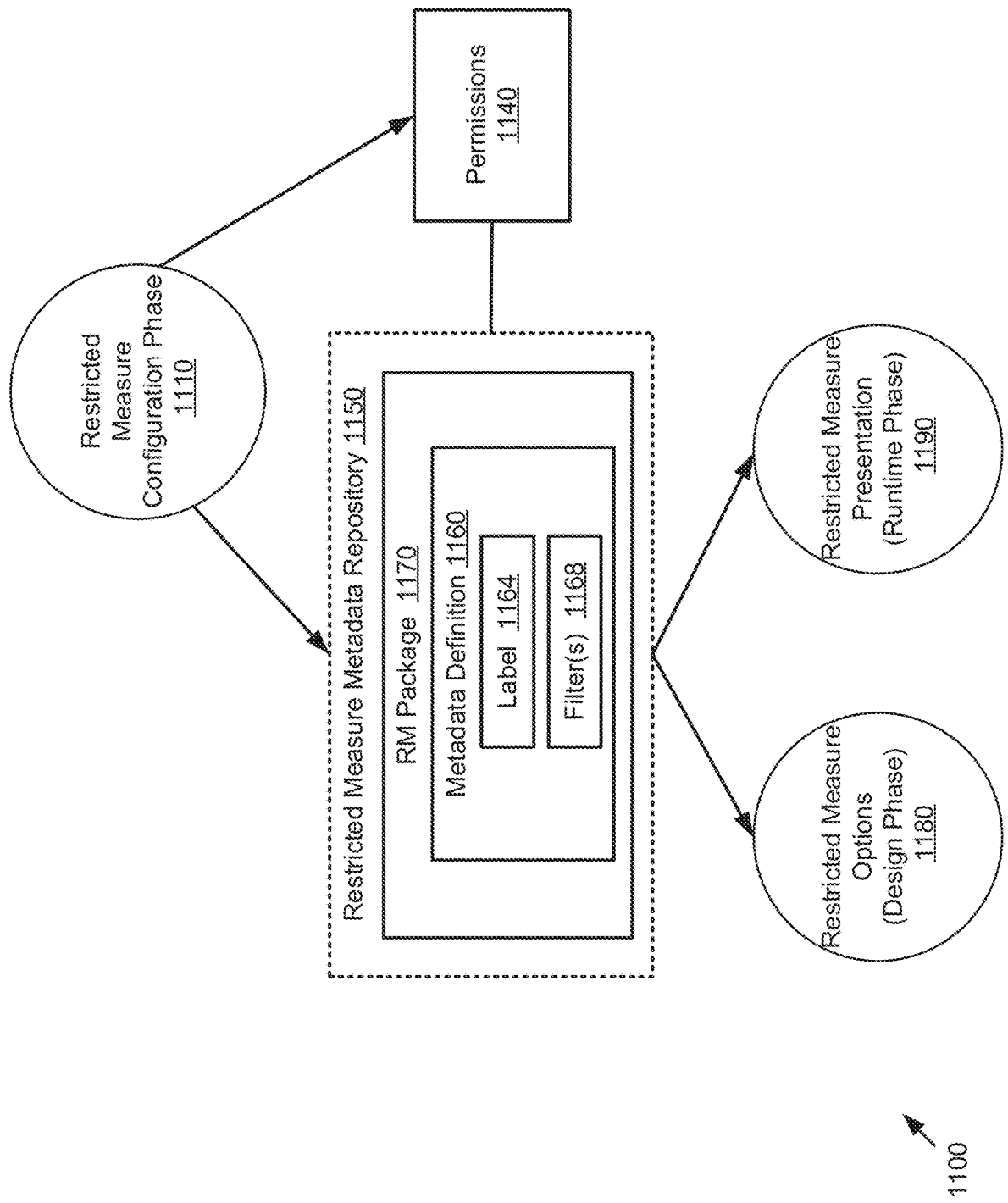
FIG. 11 is a schematic diagram illustrating reusable restricted measures.

FIG. 11 is a schematic diagram 1100 illustrating that restricted measures described herein can be reused or sharable between different users, which can be different tenants of one LoB.

As described above and further illustrated in FIG. 11, the metadata-driven restricted measures can be implemented in three phases: (1) a configuration phase 1110 where a LoB administrator can create restricted measures and configure permissions 1140 for different tenants; (2) a design phase 1180 where a report designer of a tenant can access a list of restricted measures based on permission 1140 of the tenant and add some of the restricted measures to the tenant specific database as calculation views; and (3) a runtime phase 1190 where a report user can see a list of restricted measures added to the tenant specific database by the report designer and incorporate one or more such restricted measures in a report. As shown, the created restricted measures are stored in a restricted measure metadata repository 1150 and can be arranged in one or more restricted measure packages 1170. Each restricted measure has a corresponding metadata definition 1170 which includes a label 1164 and at least one filter 1168 as described above.

Based on a tenant's permission status, all restricted measures the tenant is permitted to access are exposed at the design phase via the report designer user interface. In other words, the report designer user interface provides a centralized view of all restricted measures available to the tenant based on the tenant's license agreement. Thus, any report designer having access to the report designer user interface can see all available restricted measures, and based on specific use cases, the report designer can add any of the displayed restricted measures to the database as calculation views. Once added to the database as calculation views, those restricted measures can be displayed on the reporting user interface and are available for incorporating in a report. Thus, the restricted measures selected by the report designer and added as calculation views can be reused or shared by multiple report users (provided they are given permission to access those restricted measures). In absence of such features, a restricted measure created or used inside a specific report remains within one report and cannot be reused in other reports.

Example 10

Example Advantages

A number of advantages can be achieved via the technology described herein. For example, the metadata-driven restricted measures described herein provide a flexible solution for managing measures that can be viewable for end users. Specifically, the main view of unrestricted measures and calculated view of restricted measures are decoupled, and the latter can be permission controlled, e.g., through a licensing model implemented by LoBs. Thus, the LoBs can monetize certain complex database objects such as restricted measures, restricted dimensions, etc. These monetized objects are not pre-created in the database. Instead, they can be created in the design phase on demand LoB users and tenants can modify the metadata definitions and licensing model based on their new agreements. Each time the metadata definition is changed, tenant users (e.g., report designers and/or report users) can see a new or modified list of restricted measures. Based on the permission API, access to the restricted measure can be removed or added for any given tenant user or user groups. In addition, the restricted measures are metadata driven, which means they are controlled through metadata call. The metadata response checks the permission and provide specific permitted set of restricted measures.

As described above, the restricted measures are not required to be created and saved in original views in customer data stack (i.e., there is need to touch the original database tables and views to populate a numbers of restricted measures). Instead, the restricted measures are created automatically in the application calculation views— if and only if a report designer has selected such restricted measures in the query builder workflow provided the license permits (i.e., the restricted measure are created on demand in application specific views).

In addition, there is no need for a report user to learn application specific complex syntax to create restricted measures. Instead, once added to the calculation views, the restricted measures are available to them as drag and drop options just like any other measures or dimensions.

Further, as described above, the restricted measures are exposed at query design time via metadata to all users with query developer view (e.g., the report designer user interface). Thus, it provides a centralized view of available restricted measures. Once added to the calculation views, a restricted measure can be shared by multiple report users and reused in a number of reports.

Example 11

Example Computing Systems

Figure 12:
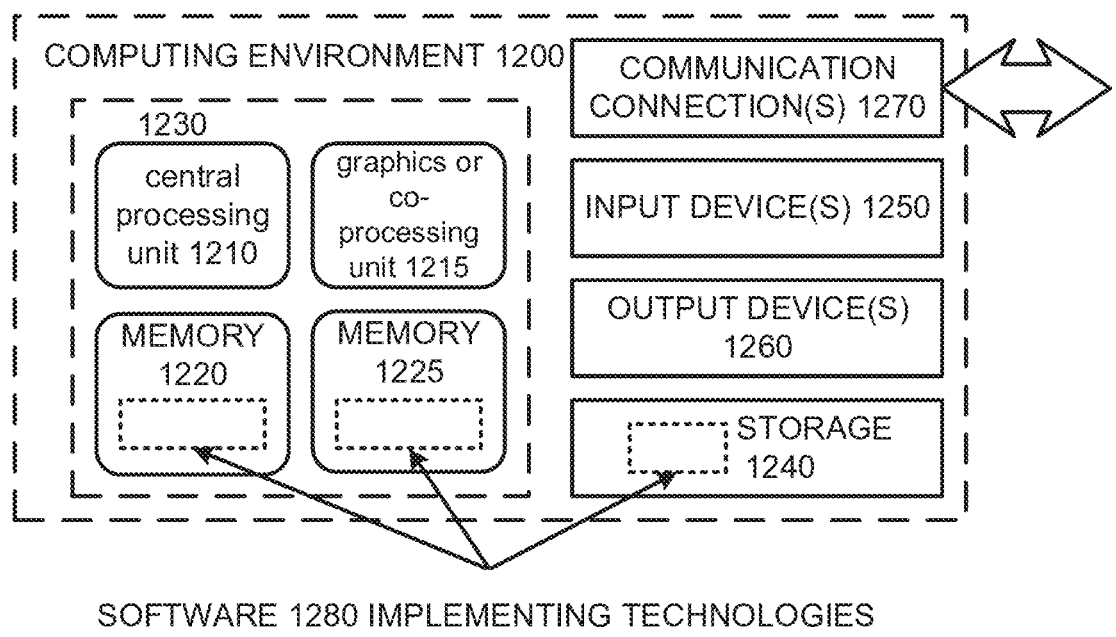
FIG. 12 is a block diagram of an example computing system in which described embodiments can be implemented.

FIG. 12 depicts an example of a suitable computing system 1200 in which the described innovations can be implemented. The computing system 1200 is not intended to suggest any limitation as to scope of use or functionality of the present disclosure, as the innovations can be implemented in diverse computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 can execute computer-executable instructions, such as for implementing the features described in the examples herein (e.g., the methods 200 and 300). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 12 shows a central processing unit 1210 as well as a graphics processing unit or co-processing unit 1215. The tangible memory 1220, 1225 can be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 can store software 1280 implementing one or more innovations described herein, in the form of computer-executable instructions suitable for execution by the processing unit(s) 1210, 1215.

A computing system 1200 can have additional features. For example, the computing system 1200 can include storage 1240, one or more input devices 1250, one or more output devices 1260, and one or more communication connections 1270, including input devices, output devices, and communication connections for interacting with a user. An interconnection mechanism (not shown) such as a bus, controller, or network can interconnect the components of the computing system 1200. Typically, operating system software (not shown) can provide an operating environment for other software executing in the computing system 1200, and coordinate activities of the components of the computing system 1200.

The tangible storage 1240 can be removable or non-removable, and includes magnetic disks, magnetic tapes or cassettes, CD-ROMs, DVDs, or any other medium which can be used to store information in a non-transitory way and which can be accessed within the computing system 1200. The storage 1240 can store instructions for the software 280 implementing one or more innovations described herein.

The input device(s) 1250 can be an input device such as a keyboard, mouse, pen, or trackball, a voice input device, a scanning device, touch device (e.g., touchpad, display, or the like) or another device that provides input to the computing system 1200. The output device(s) 1260 can be a display, printer, speaker, CD-writer, or another device that provides output from the computing system 1200.

The communication connection(s) 1270 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 12

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 13

Example Cloud Computing Environment

Figure 13:
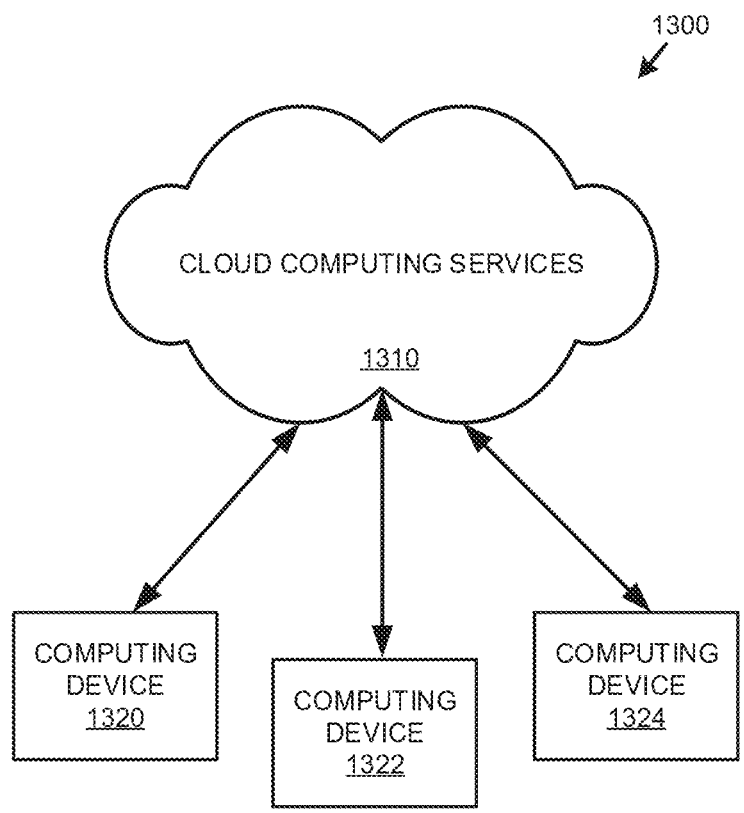
FIG. 13 is a block diagram of an example cloud computing environment that can be used in conjunction with the technologies described herein.

FIG. 13 depicts an example cloud computing environment 1300 in which the described technologies can be implemented, including, e.g., the system 100 and other systems herein. The cloud computing environment 1300 can include cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 can be utilized by various types of computing devices (e.g., client computing devices), such as computing devices 1320, 1322, and 1323. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operations (e.g., data processing, data storage, and the like).

In practice, cloud-based, on-premises-based, or hybrid scenarios can be supported.

Example 14

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 15

Example Embodiments

Any of the following example embodiments can be implemented.

Example 1. A computer-implemented method comprising: receiving access to a metadata definition of a restricted measure pertaining to a database comprising a plurality of database tables, wherein the restricted measure has a label and the metadata definition comprises one or more filter criteria configured to filter values contained in the plurality of database tables; in a report designer user interface for a report, presenting the label of the restricted measure as an option based on the metadata definition of the restricted measure; receiving a selection of the label of the restricted measure in the report designer interface; and responsive to the selection, linking the metadata definition of the restricted measure to the report, wherein the report requests access to the values contained in the plurality of database tables via application of the one or more filter criteria of the metadata definition of the restricted measure.

Example 2. The method of example 1, further comprising: responsive to the selection, before a request to generate the report has been received, creating a view for the restricted measure based on the metadata definition and storing the view in the database.

Example 3. The method of example 2, wherein creating the view comprises: creating a query against a selected database table, wherein the selected database table is one of the plurality of database tables defined by a schema of the database.

Example 4. The method of example 3, wherein creating the query comprises identifying the schema of the database based on an authenticated connection between the report designer user interface and the database.

Example 5. The method of any one of examples 3-4, wherein creating the query comprises parsing the metadata definition to identify one or more columns of the selected database table.

Example 6. The method of any one of examples 1-5, further comprising: presenting the label of the restricted measure in a reporting user interface, wherein selecting the label of the restricted measure in the reporting user interface by a report user initiates the request to generate the report.

Example 7. The method of example 6, wherein linking the metadata definition of the restricted measure to the report comprises generating a presentation of the restricted measure responsive to determining that the report user has permissions to access the restricted measure.

Example 8. The method of any one of examples 1-7, further comprising: adding the restricted measure to a package of restricted measures specific to an application, wherein the application is configured to control access to the package of restricted measures.

Example 9. The method of any one of examples 1-8, wherein presenting the restricted measure as an option is performed responsive to determining that a package of restricted measures comprising the restricted measure is activated.

Example 10. The method of any one of examples 1-9, wherein presenting the restricted measure as an option is performed responsive to determining that a tenant has permissions to a package of restricted measures comprising the restricted measure, wherein the report designer is authorized by the tenant to access the report designer user interface.

Example 11. The method of any one of examples 1-10, wherein: the report designer user interface is hosted within an application; the restricted measure is one of a plurality of restricted measures in a restricted measure package specific to the application; and the method further comprising: selecting the restricted measure package specific to the application.

Example 12. A computing system, comprising: memory; one or more hardware processors coupled to the memory; and one or more computer readable storage media storing instructions that, when loaded into the memory, cause the one or more hardware processors to perform operations comprising: receiving access to a metadata definition of a restricted measure pertaining to a database comprising a plurality of database tables, wherein the restricted measure has a label and the metadata definition comprises one or more filter criteria configured to filter values contained in the plurality of database tables; in a report designer user interface for a report, presenting the label of the restricted measure as an option based on the metadata definition of the restricted measure; receiving a selection of the label of the restricted measure in the report designer user interface; and responsive to the selection, linking the metadata definition of the restricted measure to the report, wherein the report requests access to the values contained in the plurality of database tables via application of the one or more filter criteria of the metadata definition of the restricted measure.

Example 13. The system of example 12, wherein the operations further comprise: responsive to the selection, before a request to generate the report has been received, creating a view for the restricted measure based on the metadata definition and storing the view in the database.

Example 14. The system of example 13, wherein creating the view comprises: creating a query against a selected database table, wherein the selected database table is one of the plurality of database tables defined by a schema of the database.

Example 15. The system of example 14, wherein creating the query comprises identifying the schema of the database based on an authenticated connection between the report designer user interface and the database.

Example 16. The system of any one of examples 14-15, wherein creating the query comprises parsing the metadata definition to identify one or more columns of the selected database table.

Example 17. The system of any one of examples 12-16, wherein the operations further comprise: presenting the label of the restricted measure in a reporting user interface, wherein selecting the label of the restricted measure in the reporting user interface by a report user initiates the request to generate the report, wherein linking the metadata definition of the restricted measure to the report comprises generating a presentation of the restricted measure responsive to determining that the report user has permissions to access the restricted measure.

Example 18. The system of any one of examples 12-17, wherein presenting the restricted measure as an option is performed responsive to determining that a package of restricted measures comprising the restricted measure is activated.

Example 19. The system of any one of examples 12-18, wherein presenting the restricted measure as an option is performed responsive to determining that a tenant has permissions to a package of restricted measures comprising the restricted measure, wherein the report designer is authorized by the tenant to access the report designer user interface.

Example 20. One or more non-transitory computer-readable media having encoded thereon computer-executable instructions causing one or more processors to perform a method comprising: receiving access to a metadata definition of a restricted measure pertaining to a database comprising a plurality of database tables, wherein the restricted measure has a label and the metadata definition comprises one or more filter criteria configured to filter values contained in the plurality of database tables; in a report designer user interface for a report, presenting the label of the restricted measure as an option based on the metadata definition of the restricted measure; receiving a selection of the label of the restricted measure in the report designer user interface; responsive to the selection, linking the metadata definition of the restricted measure to the report, wherein the report requests access to the values contained in the plurality of database tables via application of the one or more filter criteria of the metadata definition of the restricted measure; responsive to the selection, before a request to generate the report has been received, creating a view for the restricted measure based on the metadata definition and storing the view in the database; and presenting the label of the restricted measure in a reporting user interface, wherein selecting the label of the restricted measure in the reporting user interface by a report user initiates the request to generate the report, wherein creating the view comprises creating a query against a selected database table, wherein the selected database table is one of the plurality of database tables defined by a schema of the database, wherein creating the query comprises identifying the schema of the database based on an authenticated connection between the report designer user interface and the database, and parsing the metadata definition to identify one or more columns of the selected database table, wherein linking the metadata definition of the restricted measure to the report comprises generating a presentation of the restricted measure responsive to determining that the report user has permissions to access the restricted measure.

Example 16

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
   receiving access to a metadata definition of a restricted measure pertaining to a database comprising a plurality of database tables, wherein the restricted measure has a label and the metadata definition comprises one or more filter criteria configured to filter values contained in the plurality of database tables, wherein the one or more filter criteria are defined by at least one mathematical operator and an expression specifying a condition for applying the mathematical operator;
   in a report designer user interface for a report, presenting the label of the restricted measure as an option based on the metadata definition of the restricted measure;
   receiving a selection of the label of the restricted measure in the report designer interface;
   responsive to the selection, linking the metadata definition of the restricted measure to the report, wherein the report requests access to the values contained in the plurality of database tables via application of the one or more filter criteria of the metadata definition of the restricted measure; and
   responsive to the selection, before a request to generate the report has been received, creating a calculation view for the restricted measure and storing the calculation view in the database, wherein the calculation view is configured to apply the mathematical operator to values contained in the plurality of database tables when the condition specified by the expression is satisfied.

2. The method of claim 1, wherein creating the calculation view comprises:
   creating a query against a selected database table, wherein the selected database table is one of the plurality of database tables defined by a schema of the database.

3. The method of claim 2, wherein creating the query comprises identifying the schema of the database based on an authenticated connection between the report designer user interface and the database.

4. The method of claim 2, wherein creating the query comprises parsing the metadata definition to identify one or more columns of the selected database table.

5. The method of claim 1, further comprising:
   presenting the label of the restricted measure in a reporting user interface, wherein selecting the label of the restricted measure in the reporting user interface by a report user initiates the request to generate the report.

6. The method of claim 5, wherein linking the metadata definition of the restricted measure to the report comprises generating a presentation of the restricted measure responsive to determining that the report user has permissions to access the restricted measure.

7. The method of claim 1, further comprising:
   adding the restricted measure to a package of restricted measures specific to an application, wherein the application is configured to control access to the package of restricted measures.

8. The method of claim 1, wherein presenting the restricted measure as an option is performed responsive to determining that a package of restricted measures comprising the restricted measure is activated.

9. The method of claim 1, wherein presenting the restricted measure as an option is performed responsive to determining that a tenant has permissions to a package of restricted measures comprising the restricted measure, wherein the report designer is authorized by the tenant to access the report designer user interface.

10. The method of claim 1, wherein:
    the report designer user interface is hosted within an application;
    the restricted measure is one of a plurality of restricted measures in a restricted measure package specific to the application; and
    the method further comprising:
    selecting the restricted measure package specific to the application.

11. A computing system, comprising:
    memory;
    one or more hardware processors coupled to the memory; and
    one or more computer readable storage media storing instructions that, when loaded into the memory, cause the one or more hardware processors to perform operations comprising:
    receiving access to a metadata definition of a restricted measure pertaining to a database comprising a plurality of database tables, wherein the restricted measure has a label and the metadata definition comprises one or more filter criteria configured to filter values contained in the plurality of database tables, wherein the one or more filter criteria are defined by at least one mathematical operator and an expression specifying a condition for applying the mathematical operator;
    in a report designer user interface for a report, presenting the label of the restricted measure as an option based on the metadata definition of the restricted measure;
    receiving a selection of the label of the restricted measure in the report designer user interface;
    responsive to the selection, linking the metadata definition of the restricted measure to the report, wherein the report requests access to the values contained in the plurality of database tables via application of the one or more filter criteria of the metadata definition of the restricted measure; and
    responsive to the selection, before a request to generate the report has been received, creating a calculation view for the restricted measure and storing the calculation view in the database, wherein the calculation view is configured to apply the mathematical operator to values contained in the plurality of database tables when the condition specified by the expression is satisfied.

12. The system of claim 11, wherein creating the calculation view comprises:

creating a query against a selected database table, wherein the selected database table is one of the plurality of database tables defined by a schema of the database.

13. The system of claim 12, wherein creating the query comprises identifying the schema of the database based on an authenticated connection between the report designer user interface and the database.

14. The system of claim 12, wherein creating the query comprises parsing the metadata definition to identify one or more columns of the selected database table.

15. The system of claim 11, wherein the operations further comprise:
presenting the label of the restricted measure in a reporting user interface, wherein selecting the label of the restricted measure in the reporting user interface by a report user initiates the request to generate the report,
wherein linking the metadata definition of the restricted measure to the report comprises generating a presentation of the restricted measure responsive to determining that the report user has permissions to access the restricted measure.

16. The system of claim 11, wherein presenting the restricted measure as an option is performed responsive to determining that a package of restricted measures comprising the restricted measure is activated.

17. The system of claim 11, wherein presenting the restricted measure as an option is performed responsive to determining that a tenant has permissions to a package of restricted measures comprising the restricted measure, wherein the report designer is authorized by the tenant to access the report designer user interface.

18. One or more non-transitory computer-readable media having encoded thereon computer-executable instructions causing one or more processors to perform a method comprising:
receiving access to a metadata definition of a restricted measure pertaining to a database comprising a plurality of database tables, wherein the restricted measure has a label and the metadata definition comprises one or more filter criteria configured to filter values contained in the plurality of database tables, wherein the one or more filter criteria are defined by at least one mathematical operator and an expression specifying a condition for applying the mathematical operator;
in a report designer user interface for a report, presenting the label of the restricted measure as an option based on the metadata definition of the restricted measure;
receiving a selection of the label of the restricted measure in the report designer user interface;
responsive to the selection, linking the metadata definition of the restricted measure to the report, wherein the report requests access to the values contained in the plurality of database tables via application of the one or more filter criteria of the metadata definition of the restricted measure;
responsive to the selection, before a request to generate the report has been received, creating a calculation view for the restricted measure and storing the calculation view in the database, wherein the calculation view is configured to apply the mathematical operator to values contained in the plurality of database tables when the condition specified by the expression is satisfied; and
presenting the label of the restricted measure in a reporting user interface, wherein selecting the label of the restricted measure in the reporting user interface by a report user initiates the request to generate the report,
wherein creating the calculation view comprises creating a query against a selected database table, wherein the selected database table is one of the plurality of database tables defined by a schema of the database,
wherein creating the query comprises identifying the schema of the database based on an authenticated connection between the report designer user interface and the database, and parsing the metadata definition to identify one or more columns of the selected database table, wherein linking the metadata definition of the restricted measure to the report comprises generating a presentation of the restricted measure responsive to determining that the report user has permissions to access the restricted measure.

19. The method of claim 2, wherein the one or more filter criteria are included in a JOIN condition and a WHERE clause of an inner SELECT statement of the query for creating the calculation view.

20. The computing system of claim 12, wherein the one or more filter criteria are included in a JOIN condition and a WHERE clause of an inner SELECT statement of the query for creating the calculation view.

* * * * *